Aug. 5, 1947.   S. F. JARVIS   2,425,155
COIL SUPPORT
Filed April 16, 1946
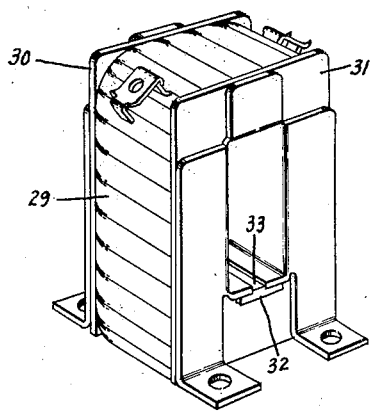
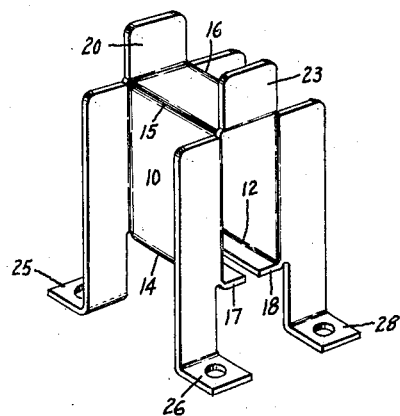
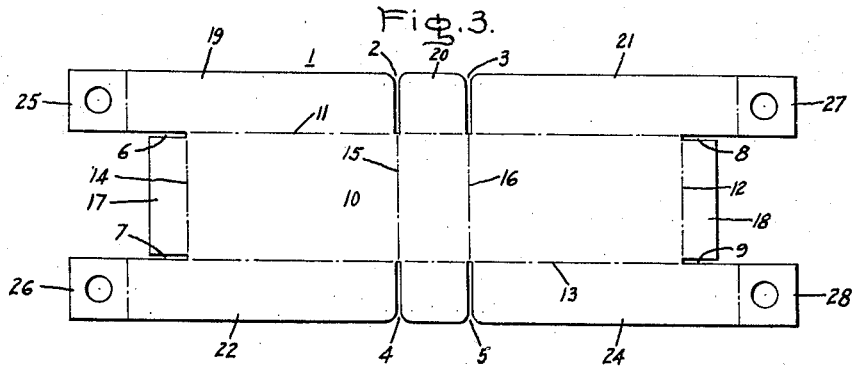
Inventor:
Samuel F. Jarvis,
by Claude H. Mitt.
His Attorney.

Patented Aug. 5, 1947

2,425,155

UNITED STATES PATENT OFFICE 2,425,155

COIL SUPPORT

Samuel F. Jarvis, Schenectady, N. Y., assignor to General Electric Company, a corporation of New York Application April 16, 1946, Serial No. 662,494

4 Claims. (Cl. 242—123)

My invention relates to coil supports, more particularly to supports for magnet coils, and has for its object a simple, reliable and inexpensive coil support made from a single piece of sheet metal.

In carrying out my invention in one form I provide a single piece of non-magnetic sheet metal comprising a central body portion which is bent to form three sides of a spool body, this central portion being provided with end portions which are bent to form together a fourth side of the spool body, and side portions which are bent at right angles with the central portion to form flanges for the spool body, the two side portions at each end of the body portion being provided with extensions forming supporting legs for the coil.

For a more complete understanding of my invention reference should be had to the accompanying drawing, Fig. 1 of which is a view in perspective of a magnget coil provided with a support embodying my invention, Fig. 2 is a view in perspective of the formed support itself, while Fig. 3 is a plan view of a sheet of metal prepared for bending into the support shown in Figs. 1 and 2.

Referring to the drawing in one form of my invention I provide a single sheet 1 made of a metal that can be readily bent, such as brass, and which is thick enough to have the rigidity required of a support for a magnet coil. This sheet is provided on opposite sides with two pairs of closely adjacent slots 2, 3, and 4, 5 directly opposite each other and with two pairs of end slots 6, 7 and 8, 9 directly opposite each other so as to define a central rectangular spool body portion 10 bounded by dot-dash lines 11, 12 and 13, 14 which lines designate the right angle bends made in the sheet in the final forming of the coil support. Two additional bends in the central portion are indicated by the dot and dash lines 15 and 16 extending between the slots 2, 4 and 3, 5.

In forming the support the sheet 1 preferably is first bent at right angles along the dot-dash lines 12, 14, 15 and 16 thereby to form four sides of a rectangular spool body as shown in Fig. 2. It will be observed that the sheet portions 17 and 18 defined by the slots 6, 7 and 8, 9 to the left hand and right hand respectively of the dot-dash lines 14 and 12 are bent toward each other to form the fourth side of the spool body. Next the upper and lower side portions 19, 20 and 21 and 22, 23, and 24 as viewed in Fig. 3 are bent at right angles outward along the dot-dash lines 11 and 13 to form end flanges on the rectangular body portion 10.

It will be observed that the flange portions 19, 22 and 21, 24 are shaped or elongated to extend an appreciable distance beyond the portions 17 and 18, thereby to form legs for the body portion. Preferably, the ends of the legs are bent outward at right angles to form feet 25, 26, 27 and 28 each of which is provided with a hole for a screw by means of which the support and the coil can be rigidly secured to a suitable support.

After the support has been shaped as shown in Fig. 2, a coil 29 of electrically insulated wire is wound on it, a suitable layer (not shown) of electrically insulating material being provided on the body 10 and layers 30 and 31 of electrically insulating material being provided between the coil and the end flanges. The two spaced apart ends of the portions 17 and 18 are held apart by means of a strip 32 of insulating material, such as fiber, having a central projecting strip or rib 33 between the ends of the portions 17 and 18.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. A support for an electric coil comprising a rectangular sheet of metal having a body portion bent along two parallel transverse lines equidistant from its ends to form three sides of a spool body, integral end portions on each side of said body portion bent relative to said body portion to form end flanges, and extensions on a plurality of end portions forming supporting legs for said spool body.

2. A support for an electric coil comprising a rectangular sheet of metal having a body portion bent at right angles along two parallel transverse lines equidistant from its ends to form three sides of a spool body, a projection on each end of said body portion bent at right angles to the said body portion to form together a fourth side of a spool body, integral end portions on each side of said body portion bent at right angles to said body portion to form end flanges, and extensions on a plurality of said end portions forming supporting legs for said spool body.

3. A single piece support for an electric coil comprising a rectangular sheet of metal having a rectangular central body portion bent along two parallel transverse lines equidistant from its ends to form three sides of a rectangular spool body, a projection on each end of said body portion bent to form together a fourth side of said spool body, three integral end portions on each side of said body portion separated by slots along said transverse lines, said end portions being bent independently of one another relative to said body portion to form end flanges for three sides of said spool body, and extensions on two of said end portions at each end of said body portion forming supporting legs for said spool body.

4. A single piece support for an electric coil comprising a rectangular sheet of metal having a rectangular central body portion bent at right angles along two parallel transverse lines equidistant from its ends to form three sides of a rectangular spool body, a projection on each end of said body portion bent at right angles to said portion to form together a fourth side of said spool body, three integral end portions on each side of said body portion separated by slots along said transverse lines, said end portions being bent independently of one another at right angles to said body portion to form end flanges for three sides of said spool body, and extensions on two of said end portions at each end of said body portion forming supporting legs for said spool body.

SAMUEL F. JARVIS.